United States Patent [19]
Schmidt

[11] 3,909,118
[45] Sept. 30, 1975

[54] FLUID COOLED MIRROR

[75] Inventor: Arthur E. Schmidt, Williamsville, N.Y.

[73] Assignee: Textron, Inc., Providence, R.I.

[22] Filed: Mar. 4, 1974

[21] Appl. No.: 447,489

[52] U.S. Cl. .............................. 350/310; 350/288
[51] Int. Cl.² .................................... G02B 5/08
[58] Field of Search ............ 350/288, 310; 165/168; 331/94.5 P, 94.5 T

[56] References Cited
UNITED STATES PATENTS

| | | | |
|---|---|---|---|
| 3,637,296 | 1/1972 | McLafferty et al. | 350/310 |
| 3,708,223 | 1/1973 | Sorensen et al. | 350/310 |
| 3,781,094 | 12/1973 | Griest | 350/310 |
| 3,817,606 | 6/1974 | Locke et al. | 350/310 |

*Primary Examiner*—Ronald L. Wibert
*Assistant Examiner*—F. L. Evans
*Attorney, Agent, or Firm*—Bean & Bean

[57] ABSTRACT

A system for cooling reflective surfaces of optical mirrors such as laser mirrors is provided, featuring use of multiple small-sized cavities or cells in the mirror body directly behind the reflective surface, through which coolant is caused to flow in short-length paths against the mirror surface between inlet/outlet openings serviced by a single or multiple manifold system, independently servicing each cavity. High coolant flow velocities at regulated rates against various surfaces of the mirror may thus be achieved according to the design requirements without incurring a large pressure drop penalty.

10 Claims, 8 Drawing Figures

FLUID COOLED MIRROR

BACKGROUND OF THE INVENTION

Fluid cooling systems for optical mirrors, capable of high rates of heat transfer and which produce absolutely minimal thermal distortions of the cooled surface are currently in great demand. For example, laser-cavity mirrors, and particularly mirrors for high-powered, continuous wave lasers, require efficient cooling in order to function properly; but appreciable deviations from the prescribed mirror shape (sometimes referred to as perfect flatness) are intolerable. Numerous proposals have been made and tried with a view to advancing this art, such as disclosed for example in U.S. Pat. Nos. 3,637,296; 3,708,223; and 3,781,094.

SUMMARY OF THE INVENTION

The present invention involves provision of a multiplicity of cavities in the mirror body directly behind the reflective surface per se, through which coolant is circulated so as to scrub in heat exchange relation the back of the reflective surface; the mirror cavities each being independently in fluid flow communication with coolant inlet/outlet manifolding. The cavity configurations and the inlet/outlet arrangements are such that the coolant flow paths against the mirror surface are of novel configurations and of extremely short lengths compared to prior art arrangements, such that high flow velocities of the coolant fluid can be achieved without incurring a large pressure drop penalty. Any liquid or gas can be used as the heat exchange medium with this concept. The exact configurations and/or dimensions of the coolant passages may take a variety of forms, depending upon various design considerations, such as; applied power distributions; allowable mirror distortion or acceptable operating temperature; properties of the coolant and their variations with temperature; coolant flow rates; maximum pressures involved; manifolding characteristics; weight limitations and the like. The coolant passages may be of a variety of planform configurations, such as square, rectangular, triangular, hexagonal, octagonal, circular; and/or combinations thereof. The invention is adaptable to use of all such regular and/or irregular coolant passage planform configurations.

In the embodiment illustrated herein the coolant passages have been proportioned for representative operating conditions, where it is desired to remove heat at the highest possible rate from the mirror surface without permitting significant deformation of that surface. The webs of the coolant passages are closely spaced, and support pins or posts are shown as being employed internally of the coolant passages to aid in limiting deformations of the heated mirror face. The primary purpose of the webs is to control the direction of flow of the coolant and to join the heated surface to its backup structure. Obviously some heat is conducted through the webs and posts and is removed by the coolant flow, but this fin effect is of rather minor significance in accordance with this concept.

The present invention provides an improved system for providing a large number of short-length multi-directional paths for coolant flow against the body of the laser mirror per se, serviced by relatively large volume inlet/outlet manifoldings. Thus, it is possible to employ very high coolant flow velocities and to achieve extremely high heat transfer coefficients without the pressure drop penalty normally associated with long length coolant flow passages of conventional nature. For many fluid flow systems the weight penalty associated with high flow rates and high pressure drops is excessive because of the power required to circulate the coolant, but this invention materially reduces such a problem. It is conventionally accepted that the limit of heat exchange technology has been reached for cooled laser mirrors with heat transfer coefficients in the range from 10,000 to 15,000 BTU/ft.$^2$ hr. °F. since the pressure drop to attain such heat transfer coefficients has reached practical limits for the flows involved. Representative proportions sized for the concept of the present invention however indicate the possibility of achieving heat transfer coefficients of between 30,000 and 60,000 BTU/ft.$^2$ hr. °F. for pressure drops comparable to those of present state of the art designs (see FIG. 7 herewith).

As an example of the advance made possible by this invention reference is made to a typical 5 inch diameter planar surface laser mirror. In the case of prior art designs the coolant flow length behind such a mirror is in the range of 2.5 inches as compared to a flow length of only 0.12 inch in the case of this example of the present invention. Since the total pressure drop is approximately directly proportional to the first power of length, the pressure drop through a mirror based on this new concept would be only 5% of that associated with the best prior art designs. With regard to the heat transfer coefficient, it is more appropriate to consider flow velocity, the square of which is approximately proportional to the pressure drop. Thus, in this example if the length difference introduces a pressure drop ratio of 20 to 1, the flow velocity using the present invention will be approximately 4.5 times as high as for the best state of the prior art design. Reference is made for the velocity/heat transfer coefficient chart at FIG. 8 herein, from which it is apparent that the invention results in an increase of the heat transfer coefficient by a factor that ranges from about 2 at low velocities to about 3 at higher velocities. Obviously, as the size of the mirror increases, the benefit to be gained from this new concept also increases.

Thus, as compared to prior state of the art designs this new concept minimizes mirror distortions by reducing the temperature level of the heat surface as compared to the temperature of the backup structure. In addition, the use of careful restraint of the heated surface by webs and ties or posts, or combinations thereof as shown in the accompanying drawing effectively minimizes thermal/pressure induced distortions of the heated surface.

BRIEF DESCRIPTION OF THE DRAWINGS

A preferred embodiment of the invention is illustrated by the accompanying drawing, wherein.

DESCRIPTION OF A PREFERRED EMBODIMENT

Figure 1:
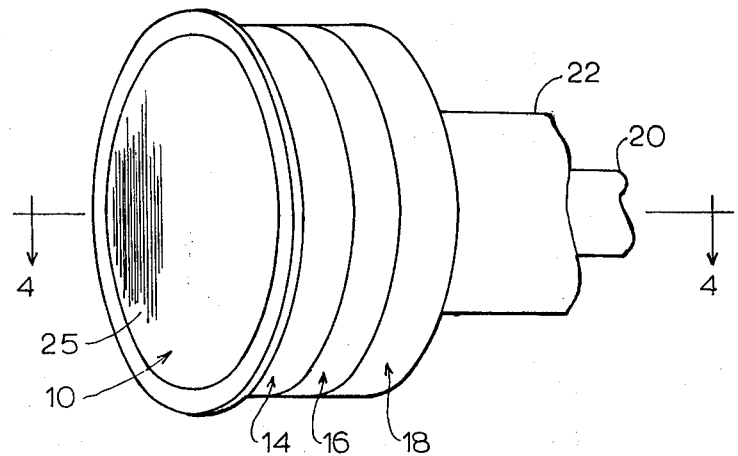
FIG. 1 is a perspective view of a typical type of laser mirror embodying a cooling system of the present invention.
Figure 2:
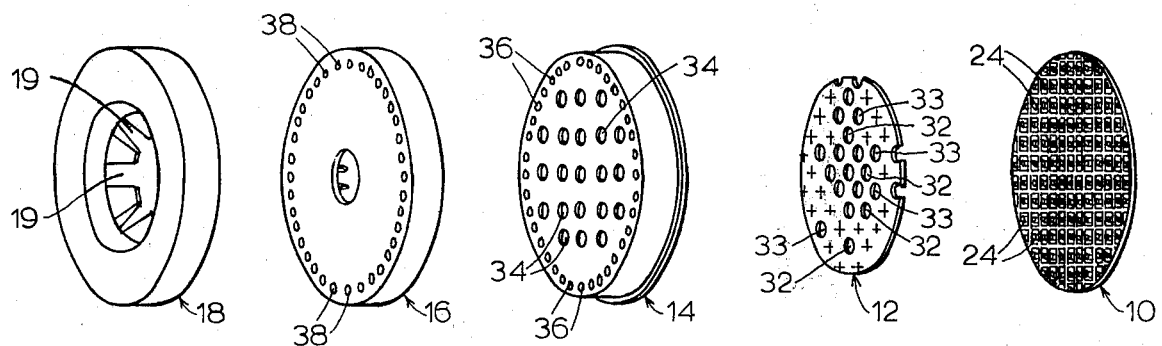
FIG. 2 is an "exploded" perspective view of the components thereof which when assembled provide such a system; showing the "back" sides thereof in reference to the showing in FIG. 1.
Figure 3:
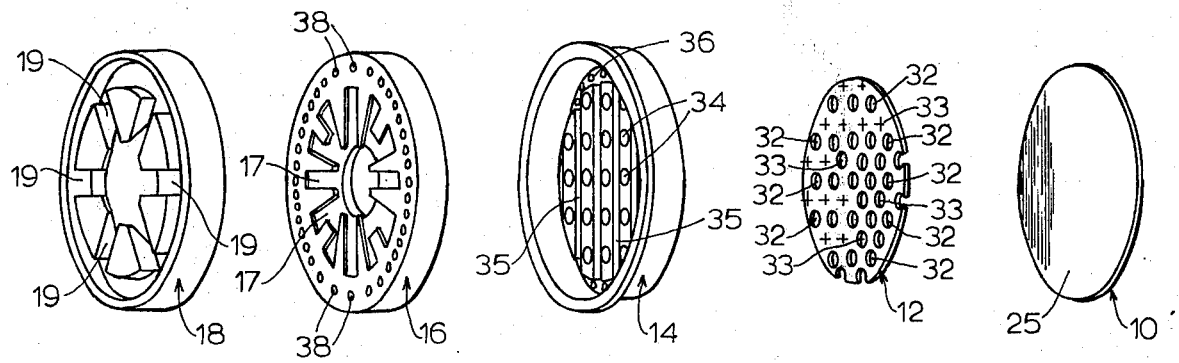
FIG. 3 corresponds to FIG. 2 but distinguishes therefrom in that it shows the "front" sides of the components of the system.

As shown herein at FIGS. 1-4, a mirror of the present invention may include a mirror face plate 10; a perforated flow distributor plate 12; a cup-shaped manifold plate 14; and an inlet manifold plate 16 having centrally located coolant inlet and peripherally located coolant outlet passageways. The assembly is completed by means of an end cap as shown at 18 which includes radially extending internal coolant outlet passageways 19. The inlet passageways 17 of member 16 are radially directed to provide fluid flow communications between a coolant inlet conduit as shown at 20 and the inlet ports 34 of member 14; and the outlet passageways 19 of member 18 are in fluid flow communication with a heat-carrying fluid outlet conduit 22.

Coolant flow cavities as shown at 24 (FIGS. 2, 4, 5, 6) are formed in the body of the face plate 10 directly behind the optically reflective surface 25 thereof. Thus, the coolant cavities and the optically reflective surface of the face plate are in intimate heat-exchanging relationship. The coolant cavities are pocket-shaped and may for example be formed on the back side of the optically reflective surface of the face plate as by the well known Electro-Discharge-Machine process sometimes referred to as the EDM process. Or, the cavities may be formed by any other suitable process; such as a chemical milling process or the like. As best shown by way of example of FIGS. 4-6, the cavities 24 are of square box-like configurations separated by thin walled fins 28, providing a plan view configuration wherein the transversely running webs 28 provide rib cross points 30. The flow distributor plate 12 is perforated as shown at 32, 33; and the parts are dimensioned and arranged relative to one another when the device is assembled so that the apertures 32, 33 overlie the cross points 30 of the fin members 28.

Figure 6:
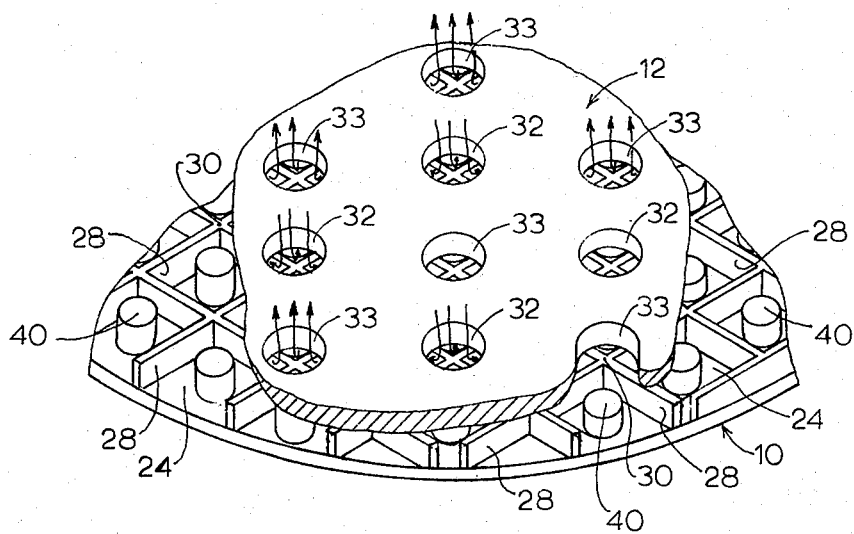
FIG. 6 is a fragmentarily broken away perspective view of a portion of the assembly, taken as suggested by line 6—6 of FIG. 4.
Figure 5:
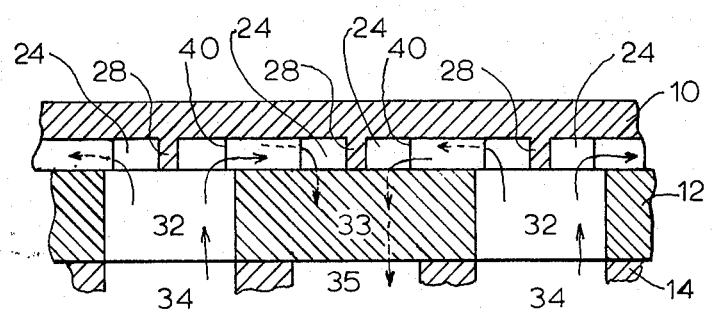
FIG. 5 is an enlarged scale fragmentary view of the boxed area designated 5 of FIG. 4.
Figure 7:
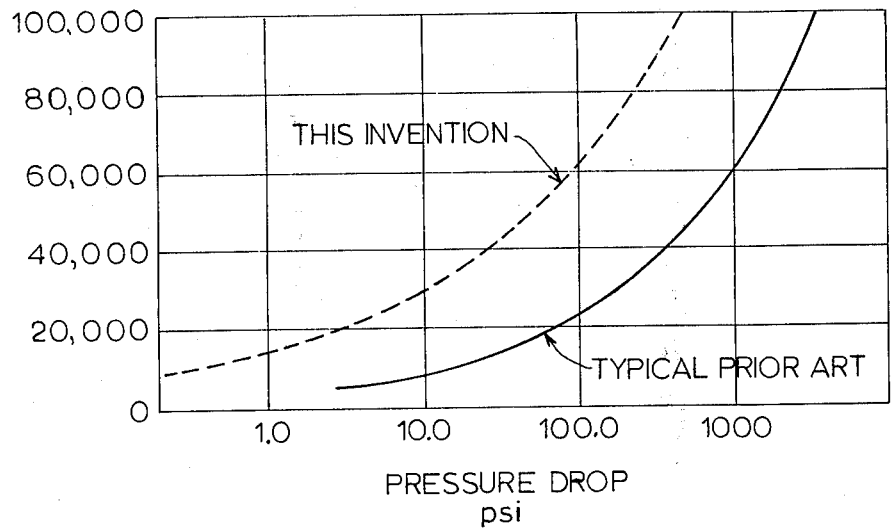
FIGS. 7 and 8 are graphical comparisons of results obtainable by the present invention vs. typical prior art devices.
Figure 8:
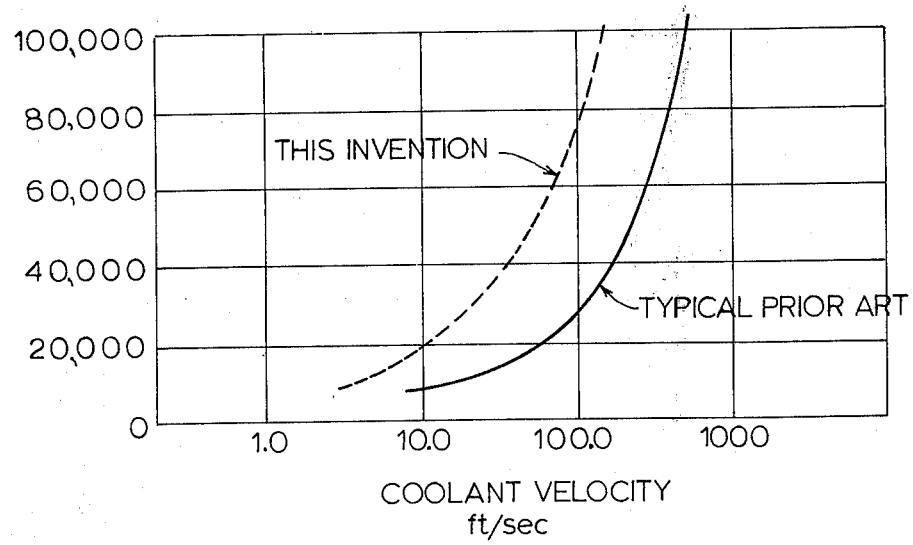

The manifold plate 14 includes fluid inlet passageways as illustrated at 34 which lead into open fluid flow communications with the apertures 32, whereby coolant fluid entering the device through conduit 20 and the second manifold 16 will be channeled to flow through the apertures 32 of the plate 12. Thus, as best shown at FIGS. 5, 6, the inflowing coolant is directed by each aperture 32 to deliver against the associated cross point 30 so as to flow into the corner portions of four separate cavities 24. The coolant thereupon flows into and through each such cavity in heat exchange scrubbing relation against the back of the mirror surface 25 toward the opposite corner of the cavity, wherefrom it escapes through an aperture 33 of the plate 12. From thence the heated coolant flows through channels 35 in the manifold 14 and then through discharge ports 36 of the manifold 14 and ports 38 of manifold 16; thence through the flow channels 19 of the end cap portion 18 and out through the conduit 22. Whereas the drawing herewith illustrates a cooling system behind the mirror which employs square-shaped cells 24, they are of necessity truncated wherever they intercept the periphery of the mirror plate. However, it will be appreciated that the cooling requirements for the peripheral portion of the mirror are of substantially lower order and are suitably served by the pool of coolant occupying the peripheral portion of the structure.

Figure 4:
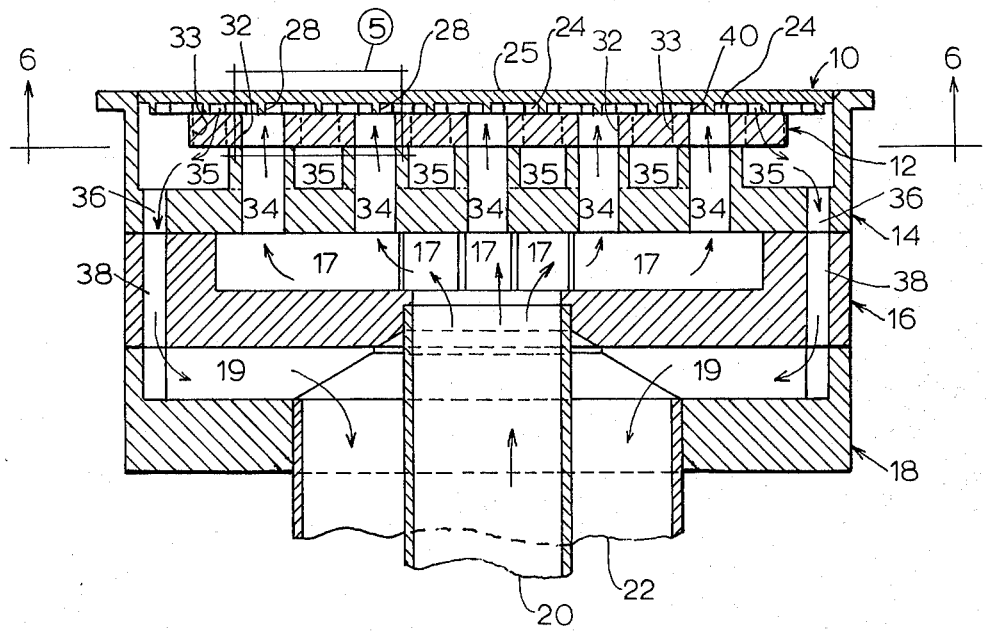
FIG. 4 is an enlarged scale sectional view taken as suggested by line 4—4 of FIG. 1.

As best shown at FIGS. 4, 5, 6, a baffle/support post such as is indicated at 40 is preferably positioned interiorly of each cooling cell 24; the post being either separately fabricated or formed integrally with either the mirror body 10 (as shown at FIG. 5) or in any other manner. For example, it might be formed integrally with the distributor plate 12. In any case, the posts are positioned to extend between the bottoms of the cells 24 as viewed at FIG. 6, and between the non-perforated portions of the plate 12, whereby it will be appreciated that the posts 40 are adapted to function both as internal stressresistant reenforcements for the relatively thin mirror body 10, and as coolant flow directing baffle devices interiorly of each cell 24. The coolant fluid entering at one corner of the cell is thereby prevented from simply flowing directly diagonally across to the outlet port of that cell, but is forced to divide and flow around the post and to thereby set up an improved heat exchange flow pattern within each cell.

The structural components of the device as illustrated and described hereinabove may of course be separately fabricated by any preferred shop practices, and subsequently assembled into functionally integrated form by any preferred method. For example, in order to attain maximum structural and leak-proof integrity and optimum thermal conductivity performance the system may be diffusion-bonded or brazed, or otherwise welded together so that the components thereof are firmly locked together in proper registry so as to attain the fluid flow passage system described hereinabove. Or, it may be suitable to adhesively functionally integrate some or all of the parts of the structure.

I claim:

1. A fluid cooled mirror assembly comprising:

a mirror member having at one face thereof an optically reflective surface and means providing a plurality of coolant circulation receptive cavities therebehind;

said cavities being separated one from another by intersecting side wall portions providing wall intersection formations;

a distributor means disposed in fluid sealing relation against said cavity walls and having some apertures therethrough to provide for flow of coolant fluid through said distributor means in the regions of some of said intersection formations into separate of said cavities, and thence through said cavities in heat-exchange flow relation against the rear of said mirror surface, and thence out through others of said apertures to provide for outlet of heat-carrying fluid, and manifold means in fluid flow communications with said apertures through said distributor means and with a supply of fluid coolant and with a fluid outlet means.

2. A mirror assembly according to claim 1, wherein said distributor means comprises a manifold having fluid inlet and fluid outlet ports in registry with selected ones of said cavities.

3. A mirror assembly according to claim 1, wherein said distributor means comprises a plate apertured in registry with selected ones of said intersection formations.

4. A mirror assembly as set forth in claim 1, wherein said cavity providing means comprises a plurality of recesses formed within the body of said mirror member.

5. A mirror assembly as set forth in claim 1, wherein said cavities are of rectangular plan form configuration.

6. A mirror assembly as set forth in claim 5, wherein said cavities are of square plan form configuration.

7. A mirror assembly as set forth in claim 2, wherein said manifold inlet and outlet ports are in registry with selected opposite corners of said cavities.

8. A mirror assembly as set forth in claim 1, wherein post means are disposed intermediately of each of said cavities.

9. A mirror assembly as set forth in claim 8, wherein said post means are fixed at their opposite ends to said mirror member and to said distributor means respectively, to reenforce said mirror member against configuration deviations.

10. A mirror assembly as set forth in claim 1, wherein the parts thereof are metallurgically bonded together in substantially fluid tight relation.

* * * * *